US012394852B2

(12) United States Patent
Clare et al.

(10) Patent No.: US 12,394,852 B2
(45) Date of Patent: Aug. 19, 2025

(54) CELL CARRIER AND VENT TRAY ARRANGEMENT FOR A HIGH-VOLTAGE BATTERY

(71) Applicant: GM GLOBAL TECHNOLOGY OPERATIONS LLC, Detroit, MI (US)

(72) Inventors: Kyle J. Clare, Brighton, MI (US); William J. Bartlomiej, II, New Haven, MI (US); James P. Depoorter, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 583 days.

(21) Appl. No.: 17/942,566

(22) Filed: Sep. 12, 2022

(65) Prior Publication Data

US 2024/0088508 A1    Mar. 14, 2024

(51) Int. Cl.
*H01M 50/253*      (2021.01)
*H01M 10/6566*     (2014.01)
*H01M 50/204*      (2021.01)
*H01M 50/264*      (2021.01)

(52) U.S. Cl.
CPC ..... *H01M 50/253* (2021.01); *H01M 10/6566* (2015.04); *H01M 50/204* (2021.01); *H01M 50/264* (2021.01)

(58) Field of Classification Search
CPC .................. H01M 50/253; H01M 10/6566
See application file for complete search history.

(56) References Cited

U.S. PATENT DOCUMENTS

| | | | |
|---|---|---|---|
| 11,791,518 B2 * | 10/2023 | Zeng | H01M 10/6554 429/56 |
| 2018/0219265 A1 * | 8/2018 | Osio | H01M 10/625 |
| 2018/0233789 A1 * | 8/2018 | Iqbal | H01M 10/625 |

* cited by examiner

Primary Examiner — Maria Laios
(74) Attorney, Agent, or Firm — Quinn IP Law

(57) ABSTRACT

A cell carrier and vent tray arrangement for high-voltage batteries includes a cell vent tray having a vent tray body having first and second tray ribs extending outward from a top surface of the vent tray body, wherein the tray ribs run along a longitudinal direction and include one or more notches formed in one or both of the tray ribs, and a cell carrier having a carrier body with a plurality of vent holes formed therethrough and a carrier rib extending outward from a bottom surface of the carrier body, wherein the carrier rib runs along the longitudinal direction and includes one or more cross-members extending in the transverse direction. The cell vent tray and cell carrier are configured for engagement with each other in an assembled configuration with the carrier rib being disposed between the first and second tray ribs and the cross-members being seated within the notches.

20 Claims, 7 Drawing Sheets

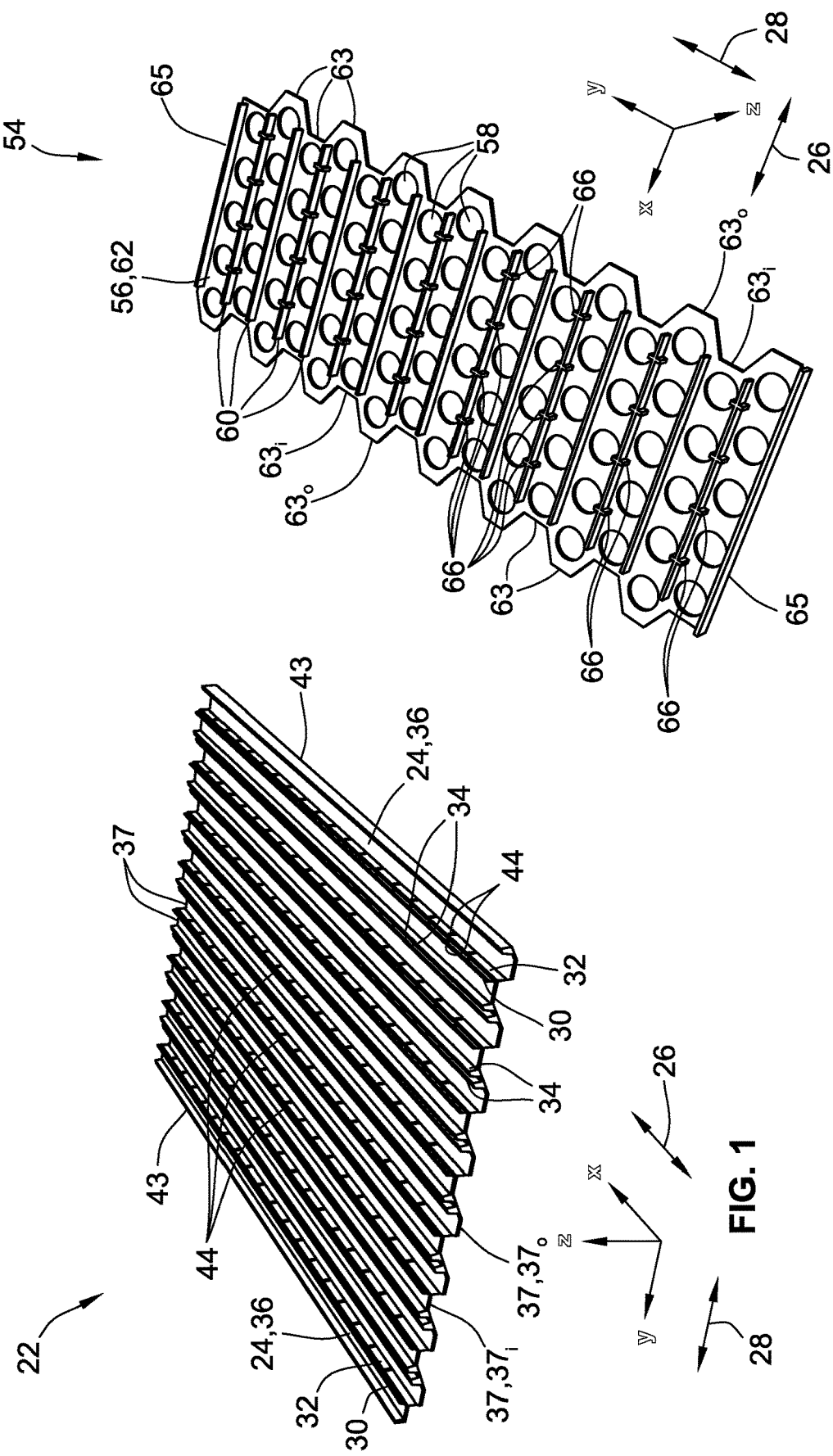

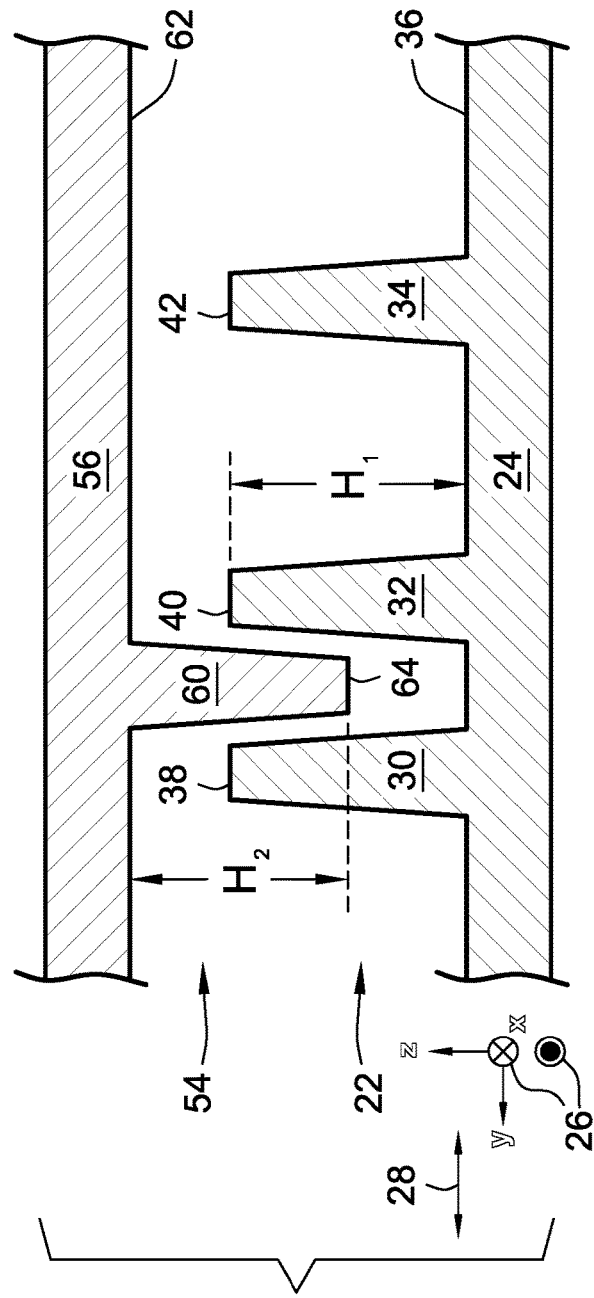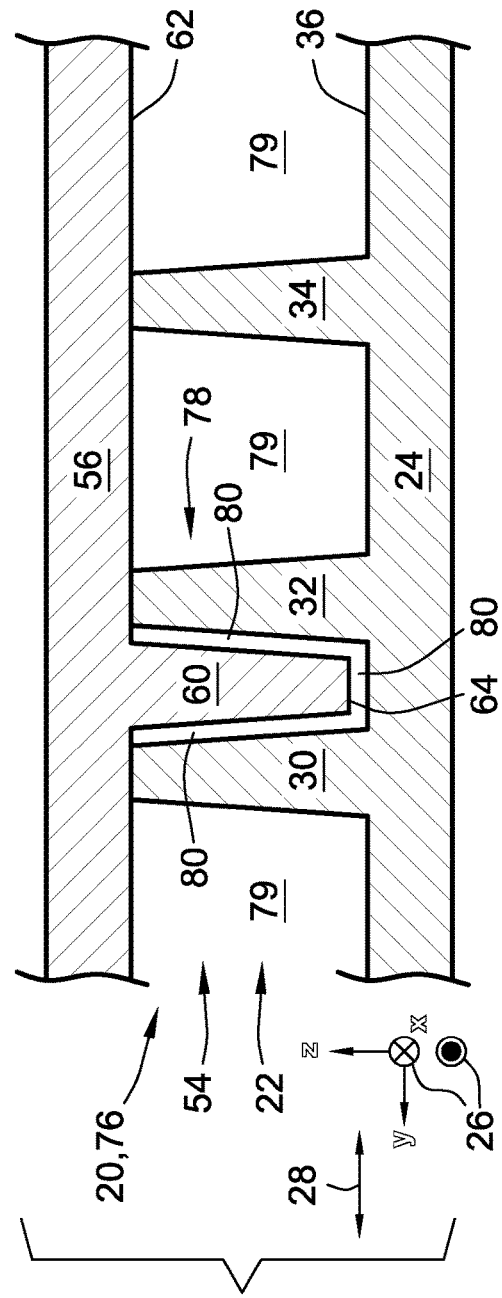

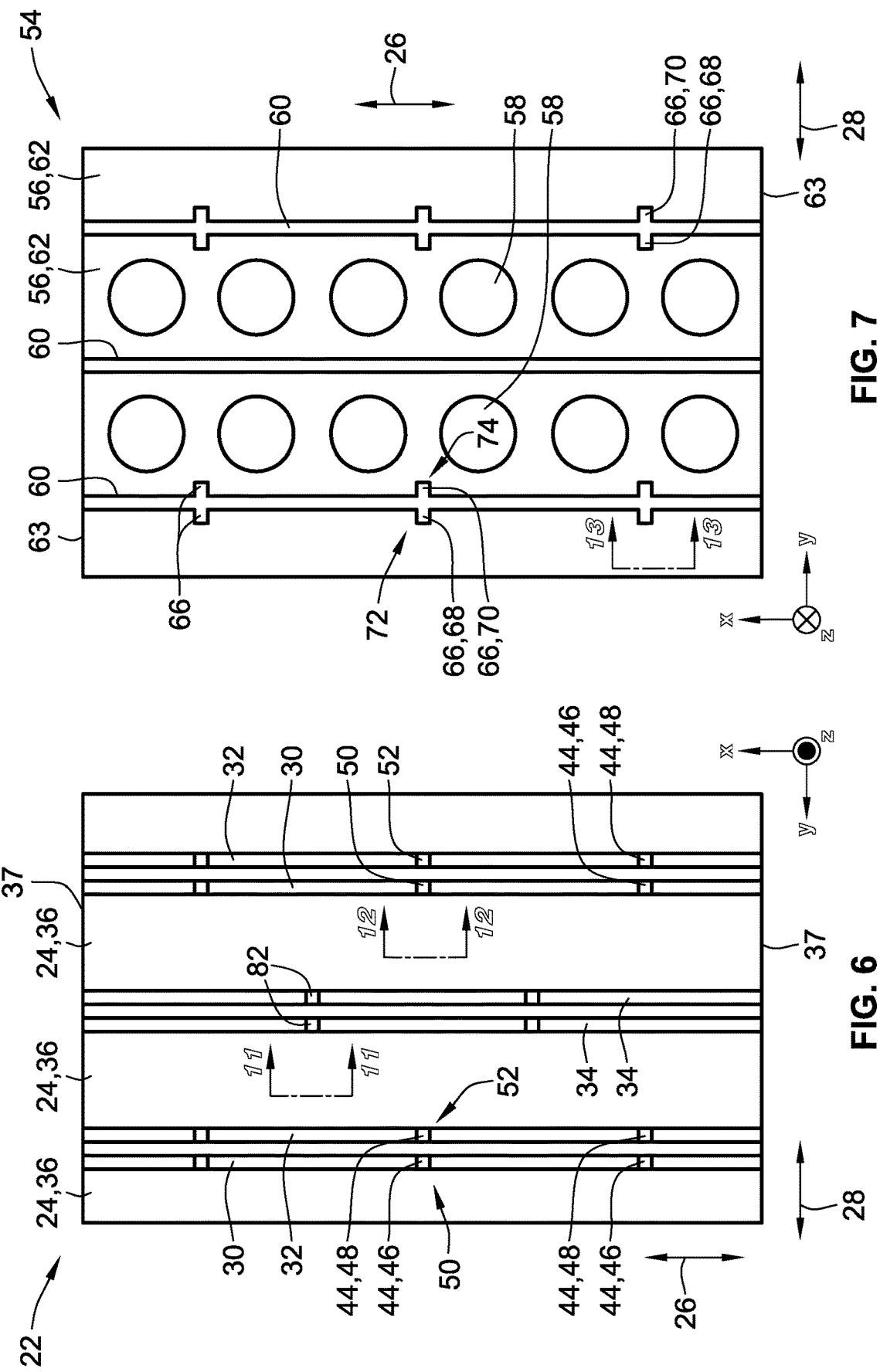

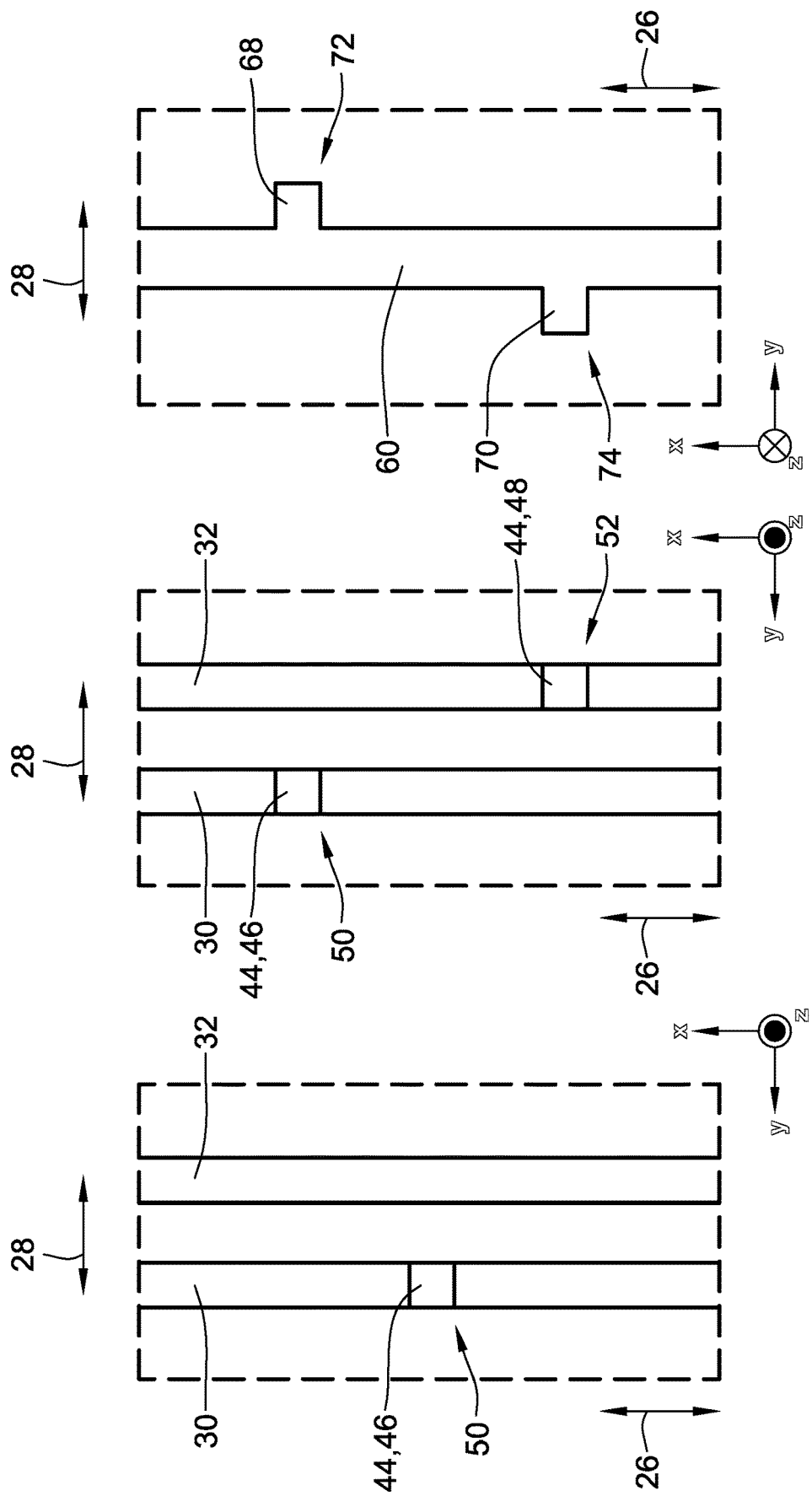

CELL CARRIER AND VENT TRAY ARRANGEMENT FOR A HIGH-VOLTAGE BATTERY

INTRODUCTION

This disclosure relates generally to cell carrier and vent tray arrangements for high-voltage batteries.

In the assembly of high-voltage batteries, it is customary practice to include a cell carrier and a cell vent tray to support and ventilate the battery cells. Ordinarily, the cell carrier and cell vent tray may be made entirely out of metal (e.g., aluminum), or they may be made of reinforced composites and polymers but with certain connection points made of metal, with the cell carrier and cell vent tray attached to each other at these connection points. However, it would be desirable to provide a cell carrier and a cell vent tray which offers increased design flexibility, such as providing the ability to avoid the use of metal connection points, reduce overall weight, etc.

SUMMARY

According to one embodiment, a cell carrier and vent tray arrangement for a high-voltage battery includes a cell vent tray and a cell carrier. The cell vent tray has a generally planar vent tray body defining a longitudinal direction and a transverse direction perpendicular to the longitudinal direction, and further has first and second tray ribs extending outward from a top surface of the vent tray body. The first and second tray ribs run along the longitudinal direction and include one or more notches formed in one or both of the tray ribs. The cell carrier has a generally planar carrier body with a plurality of vent holes formed therethrough and a carrier rib extending outward from a bottom surface of the carrier body. The carrier rib runs along the longitudinal direction and includes one or more cross-members extending in the transverse direction. The cell vent tray and cell carrier are configured for engagement with each other in an assembled configuration with the carrier rib being disposed between the first and second tray ribs and the one or more cross-members being seated within the one or more notches.

The one or more notches and the one or more cross-members may be configured for engagement with each other to form one or more mortise and tenon joints. The first and second tray ribs may extend a first height outward from the top surface of the vent tray body and the carrier rib may extend a second height outward from the bottom surface of the carrier body. The first and second heights may be approximately equal to each other, or the first height may be greater than the second height. The one or more cross-members may extend from the bottom surface of the carrier body to a third height that is less than the second height.

The one or more notches may include a first notch in the first tray rib and a second notch in the second tray rib, and the one or more cross-members may include a first cross-member and a second cross-member, wherein the first and second notches may be transversely aligned with each other and the first and second cross-members may be transversely aligned with each other. In the assembled configuration, the cell vent tray and the cell carrier may be precluded from relative movement with respect to each other in the longitudinal direction.

The cell vent tray may include a third tray rib extending outward from the top surface of the vent tray body and running along the longitudinal direction. In this configuration, one or more of the first, second and third tray ribs may include one or more weepage slots formed therein. This configuration may further include an adhesive interposed between the first, second and/or third tray rib and the bottom surface of the carrier body.

According to another embodiment, a cell carrier and vent tray arrangement for a high-voltage battery includes: (i) a cell vent tray having a generally planar vent tray body defining a longitudinal direction and a transverse direction perpendicular to the longitudinal direction and further having first and second tray ribs extending outward from a top surface of the vent tray body, wherein the tray ribs run along the longitudinal direction and include a first notch in the first tray rib and a second notch in the second tray rib, wherein the first and second notches are transversely aligned with each other; and (ii) a cell carrier having a generally planar carrier body with a plurality of vent holes formed therethrough and a carrier rib extending outward from a bottom surface of the carrier body, wherein the carrier rib runs along the longitudinal direction and includes a first cross-member and a second cross-member extending in the transverse direction and being transversely aligned with each other. The cell vent tray and cell carrier are configured for engagement with each other in an assembled configuration with the carrier rib being disposed between the first and second tray ribs and the first and second cross-members being seated within the first and second notches, respectively. In the assembled configuration, the cell vent tray and the cell carrier are precluded from relative movement with respect to each other in the longitudinal direction.

The first and second tray ribs may extend a first height outward from the top surface of the vent tray body and the carrier rib may extend a second height outward from the bottom surface of the carrier body. The first and second heights may be approximately equal to each other, or the first height may be greater than the second height. The cell vent tray may include a third tray rib extending outward from the top surface of the vent tray body and running along the longitudinal direction, and one or more of the first, second and third tray ribs may include one or more weepage slots formed therein. The arrangement may further include an adhesive interposed between the first, second and/or third tray rib and the bottom surface of the carrier body.

According to yet another embodiment, a cell carrying and venting arrangement for high-voltage batteries includes a cell vent tray and a cell carrier. The cell vent tray has a generally planar vent tray body defining a longitudinal direction and a transverse direction perpendicular to the longitudinal direction and further has a first plurality of tray ribs arranged in pairs and extending outward from a top surface of the vent tray body, wherein the tray ribs run along the longitudinal direction and include one or more notches formed in one or both of the tray ribs of each pair. The cell carrier has a generally planar carrier body with a plurality of vent holes formed therethrough and a second plurality of carrier ribs arranged in singles and extending outward from a bottom surface of the carrier body, wherein the carrier ribs run along the longitudinal direction and wherein each carrier rib includes one or more cross-members extending in the transverse direction. The cell vent tray and cell carrier are configured for engagement with each other in an assembled configuration with each of the carrier ribs being disposed between a respective pair of the tray ribs and each of the one or more cross-members being seated within a respective one of the one or more notches.

The one or more notches may include a respective first notch formed in a first of the tray ribs in each pair and a respective second notch formed in a second of the tray ribs in each pair, and the one or more cross-members may include a respective first cross-member and a respective second cross-member formed in each of the carrier ribs, wherein the respective first and second notches of each pair of tray ribs are transversely aligned with each other and the respective first and second cross-members of each carrier rib are transversely aligned with each other. In the assembled configuration, the cell vent tray and the cell carrier may be precluded from relative movement with respect to each other in the longitudinal direction. The cell vent tray may include a third plurality of tray ribs extending outward from the top surface of the vent tray body and running along the longitudinal direction, wherein one or more of the first, second and third pluralities of tray ribs may include one or more weepage slots formed therein.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 1 is a top perspective view of a cell vent tray.

FIG. 2 is a bottom perspective view of a cell carrier.

FIG. 4 is a cross-sectional view of portions of the cell carrier and the cell vent tray prior to being assembled together.

FIG. 5 is a cross-sectional view of the portions of the cell carrier and the cell vent tray of FIG. 4 after being assembled together.

FIG. 6 is a top plan view of an embodiment of the cell vent tray.

FIG. 7 is a bottom plan view of an embodiment of the cell carrier.

FIG. 8 is a top plan view of one embodiment of a portion of the cell vent tray.

FIG. 9 is a top plan view of another embodiment of a portion of the cell vent tray.

FIG. 10 is a bottom plan view of an embodiment of the cell carrier.

DETAILED DESCRIPTION

Figure 3:
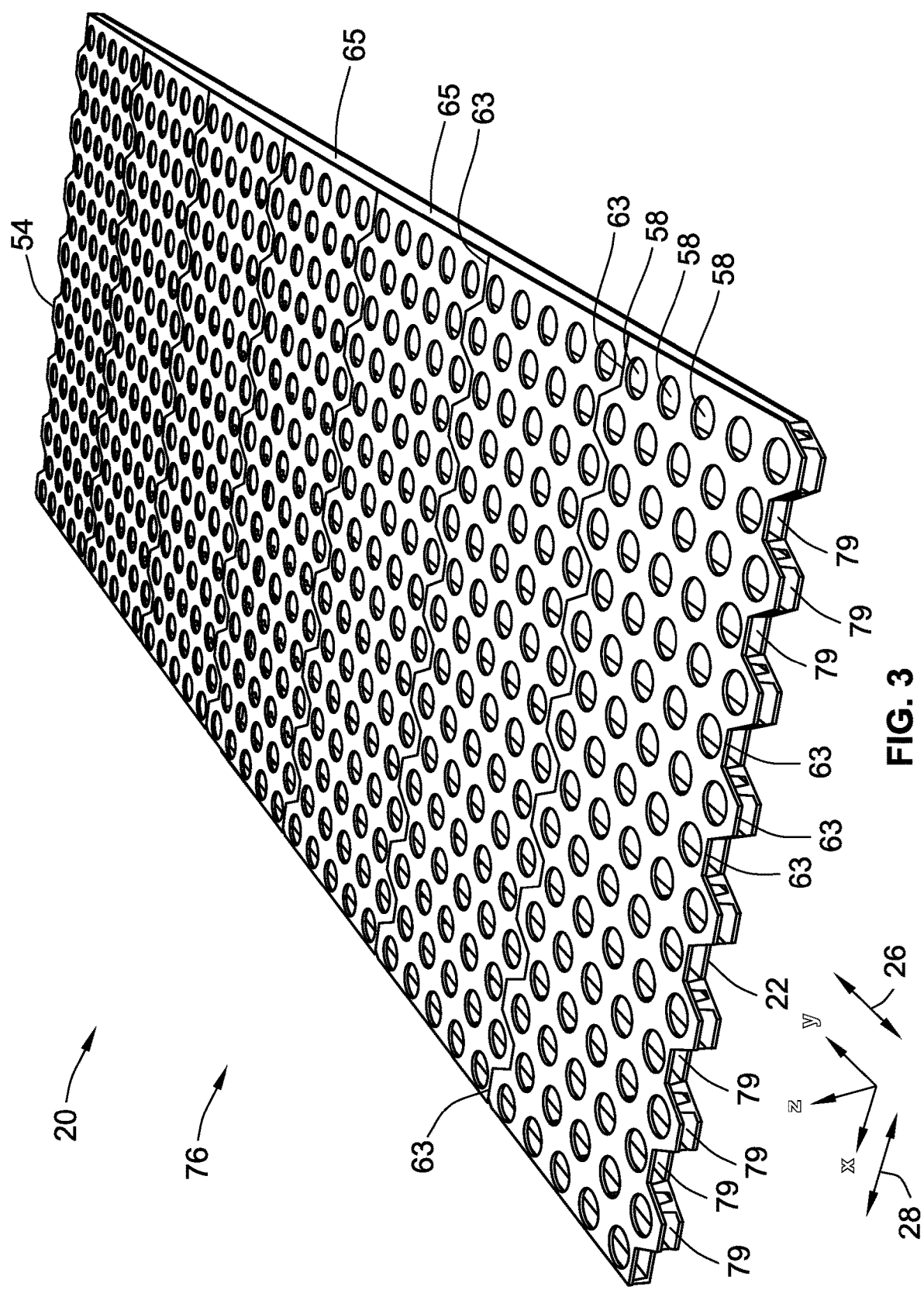
FIG. 3 is a top perspective view of a cell carrier and vent tray arrangement in an assembled configuration.

Referring now to the drawings, wherein like numerals indicate like parts in the several views, a cell carrier and vent tray arrangement 20 for a high-voltage battery is shown and described herein. The cell carrier and vent tray arrangement 20 includes a cell vent tray 22 (FIG. 1) and a cell carrier 54 (FIG. 2) that may be assembled together to form an assembled configuration 76 (FIG. 3). Note that a customary x-y-z coordinate system which follows the right-hand rule is shown in the drawings, with the positive z-direction pointing "upward" and the negative z-direction pointing "downward".

In contrast with customary approaches, the cell carrier and vent tray arrangement 20 of the present disclosure solves the technical problem of having to use metal connection points to connect the cell vent tray 22 and cell carrier 54 together. This is accomplished by the technical effect of utilizing an arrangement of ribs 30, 32, 34, 60, notches 44, and cross-members 66 to form mortise and tenon-like joints 78, along with optional adhesive and/or other optional joining methods, to connect the cell vent tray 22 and cell carrier 54 together. This arrangement 20 provides significant benefits and technical advantages over other known approaches, such as providing the ability to utilize plastic materials for the entirety of the cell vent tray 22 and the cell carrier 54, thus avoiding the use of metal connection points and reducing the overall weight of the assembled arrangement 20. Additionally, in automotive vehicle operations in which the cell carrier and vent tray arrangement 20 is utilized to support a high-voltage battery pack, the arrangement 20 allows side vehicle loads to be managed in a peel orientation rather than a shear orientation and allows load transfer into other parts of the high-voltage battery pack. Furthermore, the arrangement 20 provides built-in vent channels 79 which may be utilized for ventilating the battery pack.

FIG. 1 shows a top perspective view of one embodiment of the cell vent tray 22. The cell vent tray 22 has a generally planar vent tray body 24 which defines a longitudinal direction 26 and a transverse direction 28 that is perpendicular to the longitudinal direction 26 and lies within the plane of the vent tray body 24. The vent tray body 24 may be generally rectangular as shown, or it may assume other suitable shapes and geometries. For example, when the vent tray body 24 is presented in the rectangular shape as shown in FIG. 1, the vent tray body 24 may have a length along which the longitudinal direction 26 is defined and a width along which the transverse direction 28 is defined. The vent tray body 24 has a generally planar overall shape which may be presented as a generally flat plane, a generally curved plane or a combination of flat and curved planes.

The cell vent tray 22 also includes first and second tray ribs 30, 32 extending outward (e.g., upward) from a top surface 36 of the vent tray body 24 and running along the longitudinal direction 26. As illustrated in FIG. 1, there may be a plurality of first tray ribs 30 and second tray ribs 32, and the first and second tray ribs 30, 32 may be arranged in pairs across the top surface 36 of the vent tray body 24. For example, one pair may include a first tray rib 30 and a second tray rib 32 disposed closely together, another pair may include another first tray rib 30 and another second tray rib 32 disposed closely together, and so forth, with each pair being spaced apart from neighboring pairs.

The cell vent tray 22 may also include one or more third tray ribs 34 extending outward from the top surface 36 of the vent tray body 24 and running along the longitudinal direction 26 (i.e., parallel to the first and second tray ribs 30, 32). As shown in FIG. 1, the third tray ribs 34 may be arranged in pairs across the top surface 36 of the vent tray body 24, but the third tray ribs 34 may also be arranged in singles or in groups of three or more. For example, as exemplified in FIG. 1, two third tray ribs 34 may be disposed close to each other in a pair, with a pair of first and second tray ribs 30, 32 disposed on either side of each pair of third tray ribs 34. As described in more detail below in connection with FIGS. 4-5, the first, second and third tray ribs 30, 32, 34 may be sized and shaped so as to be similar to each other, but they may also assume sizes and shapes that are different from each other as well.

Note that one or more notches 44 may be formed in one or both of the first and second tray ribs 30, 32. As illustrated in FIGS. 1, 6, 8 and 9, one or more first notches 46 may be formed in the first tray rib 30 and one or more second notches 48 may be formed in the second tray rib 32, but notches 44 may be omitted altogether from the third tray ribs 34.

As a first example, as shown in FIG. 8, a first notch 46 may be formed in a first tray rib 30 at a first notch location 50, without any second notch 48 being formed in the neighboring second tray rib 32.

As a second example, as shown in FIGS. 1 and 6, a first notch 46 may be formed in a first tray rib 30 at a first notch location 50 and a second notch 48 may be formed in a neighboring second tray rib 32 at a second notch location 52, with the first and second notches 46, 48 being transversely aligned with each other. (As used herein, two elements being "transversely aligned with each other" may mean that a line running through the respective centers of the two elements runs parallel with the transverse direction 28 and the y-direction. Additionally or alternatively, two elements being "transversely aligned with each other" may mean that the respective locations of the two elements extend to the same extent as each other in the longitudinal direction 26 and the x-direction as measured from a given reference point. Thus, the first and second notches 46, 48 being transversely aligned with each other means that a line running through the respective centers of the two notches 46, 48 runs parallel with the transverse direction 28 and the y-direction, and/or that the respective locations 50, 52 of the two notches 46, 48 extend to the same extent as each other in the longitudinal direction 26 and the x-direction as measured from a given reference point, such as from a free edge 37 of the vent tray body 24.)

As a third example, as shown in FIG. 9, a first notch 46 may be formed in a first tray rib 30 at a first notch location 50 and a second notch 48 may be formed in a neighboring second tray rib 32 at a second notch location 52, with the first and second notches 46, 48 not being transversely aligned with each other. In this arrangement, the first and second notch locations 50, 52 are also not transversely aligned with each other FIG. 2 shows a bottom perspective view of one embodiment of the cell carrier 54. The cell carrier 54 has a generally planar carrier body 56 with a plurality of vent holes 58 formed therethrough and one or more carrier ribs 60 extending outward (e.g., downward) from a bottom surface 62 of the carrier body 56. The vent holes 58 are shown as being circular, evenly spaced and sized such that each vent hole 58 spans across most of the spacing between neighboring carrier ribs 60, but any shape, size, placement or arrangement of vent holes 58 may be used. As with the vent tray body 24 described above, the carrier body 56 may be generally rectangular as shown, or it may assume other suitable shapes and geometries, and the generally planar overall shape of the carrier body 56 may be presented as a generally flat plane, a generally curved plane or a combination of flat and curved planes.

The one or more carrier ribs 60 are disposed so as to run along the longitudinal direction 26. As illustrated in FIGS. 2 and 7, there may be a plurality of carrier ribs 60, which may be arranged in singles (i.e., singular units, as opposed to pairs or groups of three or more) across the bottom surface 62 of the carrier body 56. One or more of the carrier ribs 60 include one or more cross-members 66 formed therewith, with each cross-member 66 extending in the transverse direction 28 (e.g., in the positive or negative y-direction).

For example, as shown in FIGS. 2 and 7, selected carrier ribs 60 may each have multiple pairs of cross-members 66 distributed along the longitudinal direction 26, with each pair including a first cross-member 68 located at a first cross-member location 72 and extending in the negative y-direction, and a second cross-member 70 located at a second cross-member location 74 and extending in the positive y-direction, with the first and second cross-members 68, 70 in each pair being transversely aligned with each other. (That is, a line running through the respective centers of the two cross-members 66 in each pair runs parallel with the transverse direction 28 and the y-direction, and/or the respective locations 72, 74 of the cross-members 66 in each pair extend to the same extent as each other in the longitudinal direction 26 and the x-direction as measured from a given reference point, such as from a free edge 63 of the carrier body 56.)

Alternatively, a carrier rib 60 may include a first cross-member 68 at a given location along the longitudinal direction 26 without any second cross-member 70 provided nearby, or a second cross-member 70 at a given location along the longitudinal direction 26 without any first cross-member 68 provided nearby.

As a further alternative, a carrier rib 60 may include a first cross-member 68 and a second cross-member 70 at or near a given location along the longitudinal direction 26, but with the two cross-members 68, 70 not being transversely aligned with each other, as illustrated in FIG. 10. Here, the first cross-member 68 is located at a first cross-member location 72 and the second cross-member 70 is located at a second cross-member location 74, wherein the first and second cross-member locations 72, 74 are not transversely aligned with each other.

FIG. 3 shows a top perspective view of the cell carrier and vent tray arrangement 20 in an assembled configuration 76. In this arrangement 20, the cell carrier 54 has been placed on top of the cell vent tray 22, with the top surface 36 of the cell vent tray 22 facing upward and the bottom surface 62 of the cell carrier 54 facing downward. The cell vent tray 22 and cell carrier 54 are configured for engagement with each other in an assembled configuration 76 with each carrier rib 60 being disposed between a respective pair of first and second tray ribs 30, 32 and each set of the one or more cross-members 66 being seated within a respective set of the one or more notches 44.

The one or more notches 44 and the one or more cross-members 66 may be configured for engagement with each other to form one or more mortise and tenon joints 78. (These joints 78 may also be referred to as "mortise and tenon-like joints" and as "mortise and tenon type of joints".) In the assembled configuration 76, the cell vent tray 22 and the cell carrier 54 may be precluded from relative movement with respect to each other in the longitudinal direction 26, due to the geometries of the notches 44 and cross-members 66 which are interposed or interlocked with each other.

As illustrated in FIGS. 2-3, multiple cell carriers 54 may be connected together to effectively form a single cell carrier 54 across a single cell vent tray 22. For example, FIG. 2 shows an individual cell carrier 54 in which each of the two opposing free edges 63 includes multiple inwardly extending portions 63, and multiple outwardly extending portion 613 which are sized and shaped such that two or more of these individual cell carriers 54 may be snapped, fitted or otherwise connected together to form what is effectively a single cell carrier 54 (see FIG. 3). Similarly, as shown in FIGS. 1 and 3, the cell vent tray 22 may have two opposing free edges 37 with each free edge 37 including multiple inwardly extending portions 37, and multiple outwardly extending portion 370, so as to permit two or more cell vent trays 22 to be snapped, fitted or otherwise connected together.

As exemplified in FIGS. 1-3, the cell vent tray 22 may include two opposing vent tray flaps 43 which extend upward in the positive z-direction, and the cell carrier 54 may include two opposing carrier flaps 65 which extend downward in the negative z-direction. These flaps 43, 65 may be dimensioned so as to be snapped, fitted or otherwise connected together, thus aiding in connecting the cell vent tray 22 and the cell carrier 54 with each other and adding to the overall structural integrity of the cell carrier and vent tray arrangement 20.

FIG. 4 shows a cross-sectional close-up view of selected portions of the cell vent tray 22 and the cell carrier 54 prior to being assembled together, and FIG. 5 shows the resulting assembled configuration 76 after the cell vent tray 22 and the cell carrier 54 have been assembled together. The respective distal ends 38, 40, 42 of the first, second and third tray ribs 30, 32, 34 may extend a first height $H_1$ outward (e.g., upward) from the top surface 36 of the vent tray body 24, and the distal end 64 of each carrier rib 60 may extend a second height $H_2$ outward (e.g., downward) from the bottom surface 62 of the carrier body 56.

In some configurations, the first and second heights $H_1$, $H_2$ may be approximately equal to each other (i.e., $H_1 \approx H_2$), such that in the assembled configuration 76 the distal end 64 of the carrier rib 60 rests on the portion of the top surface 36 of the vent tray body 24 that is between the first and second tray ribs 30, 32. Alternatively, the first height $H_1$ may be greater than the second height $H_2$ (i.e., $H_1 > H_2$), as illustrated in FIGS. 4-5, such that in the assembled configuration 76 a gap 80 is provided between the distal end 64 of the carrier rib 60 and the portion of the top surface 36 of the vent tray body 24 that is between the first and second tray ribs 30, 32. In the assembled configuration 76, the aforementioned gap 80 may optionally extend around some or all of the second height $H_2$ of the carrier rib 60; alternatively, a snug fit may be provided between the carrier rib 60 and the first and second tray ribs 30, 32 such that little or no gap 80 extends along the second height $H_2$. When assembled in the assembled configuration 76, the cell carrier and vent tray arrangement 20 may include an adhesive interposed between the first, second and/or third tray rib 30, 32, 34 and the bottom surface 62 of the carrier body 56, including within some or all of any gap 80. Optionally, the assembled arrangement 20 may additionally or alternatively include one or more other joining methods for fastening the cell vent tray 22 and cell carrier 54 together, such as heat staking/heat stake welding, sonic/ultrasonic welding and the like.

In the assembled configuration 76 as illustrated in FIGS. 3 and 5, note that a plurality of vent channels 79 are formed along the longitudinal direction 26. These vent channels 79 are defined and bounded by various combinations of a first tray rib 30, a second tray rib 32, a third tray rib 34, the top surface 36 of the vent tray body 24, and the bottom surface 62 of the carrier body 56.

Figure 11:
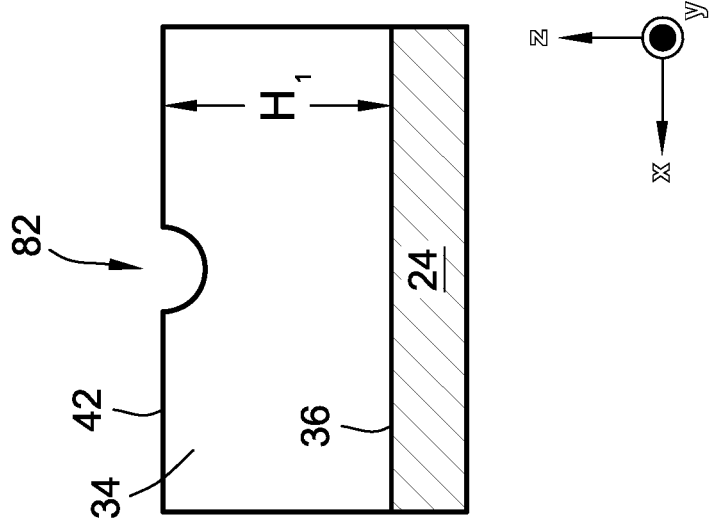
FIG. 11 is an elevation view of the weepage slots as viewed along line 11-11 of FIG. 6.

FIG. 11 is an elevation view along line 11-11 of FIG. 6. As shown here, as well as in FIGS. 1 and 6, one or more weepage slots 82 may be formed in one or more of the first tray ribs 30, one or more of the second tray ribs 32 and/or one or more of the third tray ribs 34. These weepage slots 82 may be provided to accommodate the application of adhesive between the distal ends 38, 40, 42 of the tray ribs 30, 32, 34 and the bottom surface 62 of the cell carrier 54. That is, the weepage slots 82 may provide overflow points for the adhesive so that the tray ribs 30, 32, 34 and the bottom surface 62 may be pressed against each to a predetermined or desired degree, in order to facilitate optimum bonding between the cell vent tray 22 and the cell carrier 54. Note that the weepage slots 82 may optionally be relatively short in height (e.g., much less than the first height $H_1$ of the tray ribs 30, 32, 34), and may be defined in the distal ends 38, 40, 42 of the tray ribs 30, 32, 34.

Figure 13:
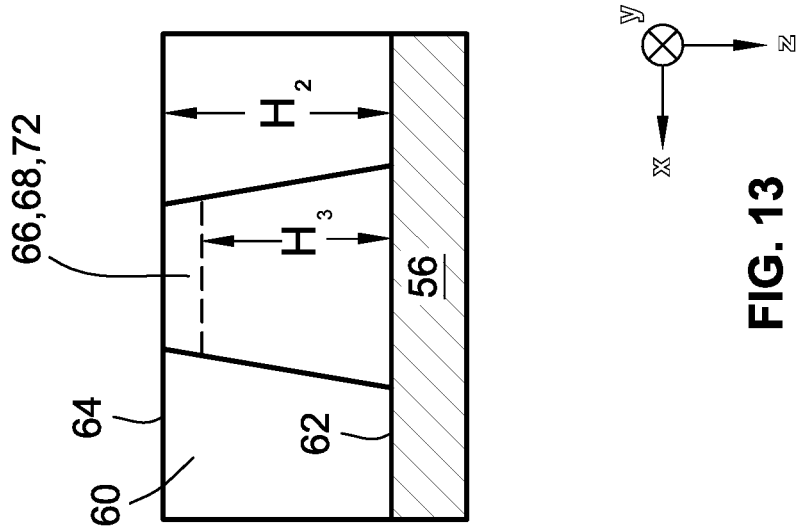
FIG. 13 is an elevation view of the cross-members as viewed along line 13-13 of FIG. 7.
Figure 12:
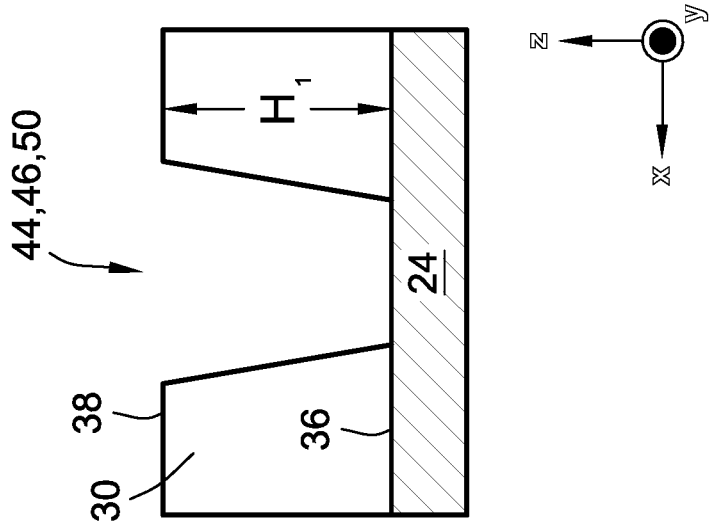
FIG. 12 is an elevation view of the notches as viewed along line 12-12 of FIG. 6.
Figure 14:
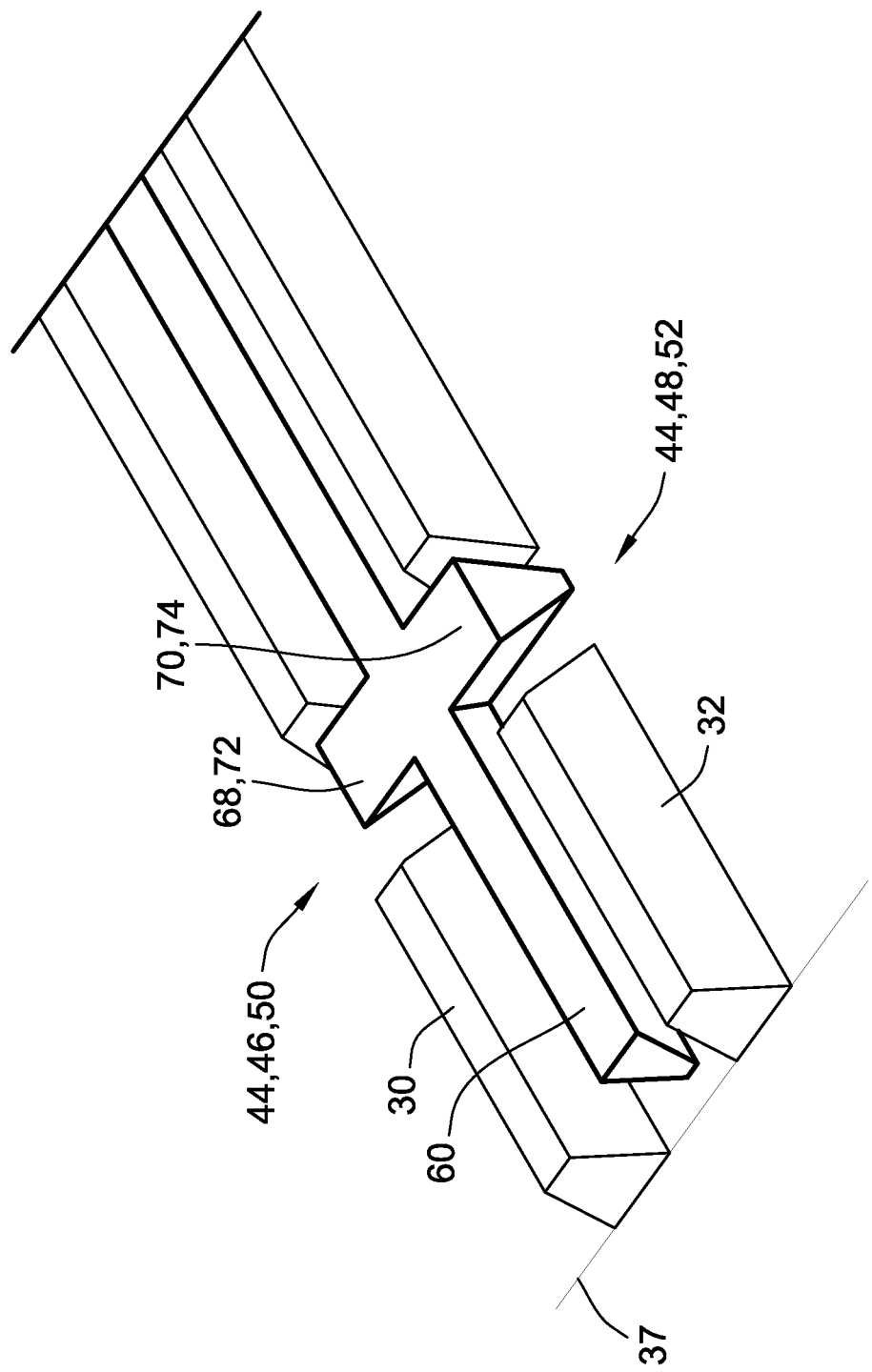
FIG. 14 is a perspective view of a mortise and tenon joint type of joint formed by notches and cross-members in the assembled configuration, but with the carrier body removed.

FIG. 12 is an elevation view of the notches 44 as viewed along line 12-12 of FIG. 6, FIG. 13 is an elevation view of the cross-members 66 as viewed along line 13-13 of FIG. 7, and FIG. 14 is a perspective view of a mortise and tenon type of joint 78 formed by the notches 44 and cross-members 66 in the assembled configuration 76, but with the carrier body 56 removed. Note that the notches 44 may extend from the top surface 36 of the vent tray body 24 to the full first height $H_1$ of the tray ribs 30, 32 as shown in FIG. 12, or they may optionally extend to a height that is less than the first height $H_1$. Similarly, the cross-members 66 may extend from the bottom surface 62 of the carrier body 56 to the full second height $H_2$ of the carrier ribs 60 as shown in FIG. 13, or they may optionally extend to a third height $H_3$ that is less than the second height $H_2$ (i.e., $H_3 < H_2$), such as up to the dashed line shown in FIG. 13.

It may be noted that while the longitudinal and transverse directions 26, 28 are described above as being defined with respect to the vent tray body 24 (e.g., FIGS. 1 and/or 6), these directions 26, 28 may additionally or alternatively be defined with respect to the carrier body 56 (e.g., FIGS. 2 and/or 7) and/or with respect to the assembled configuration 76 of the overall cell carrier and vent tray arrangement 20 (e.g., FIG. 3).

According to another embodiment, a cell carrier and vent tray arrangement 20 for a high-voltage battery includes: (i) a cell vent tray 22 having a generally planar vent tray body 24 defining a longitudinal direction 26 and a transverse direction 28 perpendicular to the longitudinal direction 26 and further having first and second tray ribs 30, 32 extending outward from a top surface 36 of the vent tray body 24, wherein the tray ribs 30, 32 run along the longitudinal direction 26 and include a first notch 46 in the first tray rib 30 and a second notch 48 in the second tray rib 32, wherein the first and second notches 46, 48 are transversely aligned with each other; and (ii) a cell carrier 54 having a generally planar carrier body 56 with a plurality of vent holes 58 formed therethrough and a carrier rib 60 extending outward from a bottom surface 62 of the carrier body 56, wherein the carrier rib 60 runs along the longitudinal direction 26 and includes a first cross-member 68 and a second cross-member 70 each extending in the transverse direction 28 and being transversely aligned with each other. The cell vent tray 22 and cell carrier 54 are configured for engagement with each other in an assembled configuration 76 with the carrier rib 60 being disposed between the first and second tray ribs 30, 32 and the first and second cross-members 68, 70 being seated within the first and second notches 46, 48, respectively. In the assembled configuration 76, the cell vent tray 22 and the cell carrier 54 are precluded from relative movement with respect to each other in the longitudinal direction 26.

The first and second tray ribs 30, 32 may extend a first height $H_1$ outward from the top surface 36 of the vent tray body 24 and the carrier rib 60 may extend a second height $H_2$ outward from the bottom surface 62 of the carrier body 56. The first and second heights $H_1$, $H_2$ may be approximately equal to each other (i.e., $H_1 \approx H_2$), or the first height $H_1$ may be greater than the second height $H_2$ (i.e., $H_1 > H_2$). The cell vent tray 22 may include a third tray rib 34 extending outward from the top surface 36 of the vent tray body 24 and running along the longitudinal direction 26, and one or more of the first, second and third tray ribs 30, 32, 34 may include one or more weepage slots 82 formed therein. The arrangement may further include an adhesive interposed between the first, second and/or third tray rib 30, 32, 34 and the bottom surface 62 of the carrier body 56.

According to yet another embodiment, a cell carrying and venting arrangement 20 for high-voltage batteries includes a cell vent tray 22 and a cell carrier 54. The cell vent tray 22 has a generally planar vent tray body 24 defining a longitudinal direction 26 and a transverse direction 28 perpendicular to the longitudinal direction 26. The cell vent tray 22 further has a first plurality of tray ribs 30, 32 arranged in pairs and extending outward from a top surface 36 of the vent tray body 24. The tray ribs 30, 32 run along the longitudinal direction 26 and include one or more notches 44 formed in one or both of the tray ribs 30, 32 of each pair of tray ribs 30, 32. The cell carrier 54 has a generally planar carrier body 56 with a plurality of vent holes 58 formed therethrough and a second plurality of carrier ribs 60 arranged in singles and extending outward from a bottom surface 62 of the carrier body 56. The carrier ribs 60 run along the longitudinal direction 26 and each carrier rib 60 includes one or more cross-members 66 extending in the transverse direction 28. The cell vent tray 22 and the cell carrier 54 are configured for engagement with each other in an assembled configuration 76 with each of the carrier ribs 60 being disposed between a respective pair of the tray ribs 30, 32 and each of the one or more cross-members 66 being seated within a respective one of the one or more notches 44.

The one or more notches 44 may include a respective first notch 46 formed in a first of the tray ribs 30, 32 in each pair (e.g., in the first tray rib 30) and a respective second notch 48 formed in a second of the tray ribs 30, 32 in each pair (e.g., in the second tray rib 32), and the one or more cross-members 66 may include a respective first cross-member 68 and a respective second cross-member 70 formed in each of the carrier ribs 60, wherein the respective first and second notches 46, 48 of each pair of tray ribs 30, 32 are transversely aligned with each other and the respective first and second cross-members 68, 70 of each carrier rib 60 are transversely aligned with each other. In the assembled configuration 76, the cell vent tray 22 and the cell carrier 54 may be precluded from relative movement with respect to each other in the longitudinal direction 26. The cell vent tray 22 may include a third plurality of tray ribs 34 extending outward from the top surface 36 of the vent tray body 24 and running along the longitudinal direction 26, wherein one or more of the first, second and third pluralities of tray ribs 30, 32, 34 may include one or more weepage slots 82 formed therein.

(It may be noted that at some points throughout the present disclosure, reference may be made to a singular input, output, element, etc., while at other points reference may be made to plural/multiple inputs, outputs, elements, etc. Thus, weight should not be given to whether the input(s), output(s), element(s), etc. are used in the singular or plural form at any particular point in the present disclosure, as the singular and plural uses of such words should be viewed as being interchangeable, unless the specific context dictates otherwise.)

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A cell carrier and vent tray arrangement for a high-voltage battery, comprising:
   a cell vent tray having a generally planar vent tray body defining a longitudinal direction and a transverse direction perpendicular to the longitudinal direction and further having first and second tray ribs extending outward from a top surface of the vent tray body, wherein the tray ribs run along the longitudinal direction and include one or more notches formed in one or both of the tray ribs; and
   a cell carrier having a generally planar carrier body with a plurality of vent holes formed therethrough and a carrier rib extending outward from a bottom surface of the carrier body, wherein the carrier rib runs along the longitudinal direction and includes one or more cross-members extending in the transverse direction;
   wherein the cell vent tray and cell carrier are configured for engagement with each other in an assembled configuration with the carrier rib being disposed between the first and second tray ribs and the one or more cross-members being seated within the one or more notches.

2. The cell carrier and vent tray arrangement of claim 1, wherein the one or more notches and the one or more cross-members are configured for engagement with each other to form one or more mortise and tenon joints.

3. The cell carrier and vent tray arrangement of claim 1, wherein the first and second tray ribs extend a first height outward from the top surface of the vent tray body and the carrier rib extends a second height outward from the bottom surface of the carrier body.

4. The cell carrier and vent tray arrangement of claim 3, wherein the first and second heights are approximately equal to each other.

5. The cell carrier and vent tray arrangement of claim 3, wherein the first height is greater than the second height.

6. The cell carrier and vent tray arrangement of claim 3, wherein the one or more cross-members extend from the bottom surface of the carrier body to a third height that is less than the second height.

7. The cell carrier and vent tray arrangement of claim 1, wherein the one or more notches comprise a first notch in the first tray rib and a second notch in the second tray rib, and the one or more cross-members comprise a first cross-member and a second cross-member, wherein the first and second notches are transversely aligned with each other and the first and second cross-members are transversely aligned with each other.

8. The cell carrier and vent tray arrangement of claim 1, wherein in the assembled configuration, the cell vent tray and the cell carrier are precluded from relative movement with respect to each other in the longitudinal direction.

9. The cell carrier and vent tray arrangement of claim 1, wherein the cell vent tray includes a third tray rib extending outward from the top surface of the vent tray body and running along the longitudinal direction, and wherein one or more of the first, second and third tray ribs include one or more weepage slots formed therein.

10. The cell carrier and vent tray arrangement of claim 9, further including an adhesive interposed between the first, second and/or third tray rib and the bottom surface of the carrier body.

11. A cell carrier and vent tray arrangement for a high-voltage battery, comprising:
a cell vent tray having a generally planar vent tray body defining a longitudinal direction and a transverse direction perpendicular to the longitudinal direction and further having first and second tray ribs extending outward from a top surface of the vent tray body, wherein the tray ribs run along the longitudinal direction and include a first notch in the first tray rib and a second notch in the second tray rib, wherein the first and second notches are transversely aligned with each other; and
a cell carrier having a generally planar carrier body with a plurality of vent holes formed therethrough and a carrier rib extending outward from a bottom surface of the carrier body, wherein the carrier rib runs along the longitudinal direction and includes a first cross-member and a second cross-member extending in the transverse direction and being transversely aligned with each other;
wherein the cell vent tray and cell carrier are configured for engagement with each other in an assembled configuration with the carrier rib being disposed between the first and second tray ribs and the first and second cross-members being seated within the first and second notches, respectively;
wherein in the assembled configuration, the cell vent tray and the cell carrier are precluded from relative movement with respect to each other in the longitudinal direction.

12. The cell carrier and vent tray arrangement of claim 11, wherein the first and second tray ribs extend a first height outward from the top surface of the vent tray body and the carrier rib extends a second height outward from the bottom surface of the carrier body.

13. The cell carrier and vent tray arrangement of claim 12, wherein the first and second heights are approximately equal to each other.

14. The cell carrier and vent tray arrangement of claim 12, wherein the first height is greater than the second height.

15. The cell carrier and vent tray arrangement of claim 11, wherein the cell vent tray includes a third tray rib extending outward from the top surface of the vent tray body and running along the longitudinal direction, and wherein one or more of the first, second and third tray ribs include one or more weepage slots formed therein.

16. The cell carrier and vent tray arrangement of claim 15, further including an adhesive interposed between the first, second and/or third tray rib and the bottom surface of the carrier body.

17. A cell carrying and venting arrangement for high-voltage batteries, comprising:
a cell vent tray having a generally planar vent tray body defining a longitudinal direction and a transverse direction perpendicular to the longitudinal direction and further having a first plurality of tray ribs arranged in pairs and extending outward from a top surface of the vent tray body, wherein the tray ribs run along the longitudinal direction and include one or more notches formed in one or both of the tray ribs of each pair; and
a cell carrier having a generally planar carrier body with a plurality of vent holes formed therethrough and a second plurality of carrier ribs arranged in singles and extending outward from a bottom surface of the carrier body, wherein the carrier ribs run along the longitudinal direction and wherein each carrier rib includes one or more cross-members extending in the transverse direction;
the cell vent tray and cell carrier being configured for engagement with each other in an assembled configuration with each of the carrier ribs being disposed between a respective pair of the tray ribs and each of the one or more cross-members being seated within a respective one of the one or more notches.

18. The cell carrying and venting arrangement of claim 17, wherein the one or more notches comprise a respective first notch formed in a first of the tray ribs in each pair and a respective second notch formed in a second of the tray ribs in each pair, and the one or more cross-members comprise a respective first cross-member and a respective second cross-member formed in each of the carrier ribs, wherein the respective first and second notches of each pair of tray ribs are transversely aligned with each other and the respective first and second cross-members of each carrier rib are transversely aligned with each other.

19. The cell carrying and venting arrangement of claim 17, wherein in the assembled configuration, the cell vent tray and the cell carrier are precluded from relative movement with respect to each other in the longitudinal direction.

20. The cell carrying and venting arrangement of claim 17, wherein the cell vent tray includes a third plurality of tray ribs extending outward from the top surface of the vent tray body and running along the longitudinal direction, and wherein one or more of the first, second and third pluralities of tray ribs include one or more weepage slots formed therein.

* * * * *